M. Riehl.
Book Trimming Mach.

No. 3,422. Reissued May 4, 1869.

United States Patent Office.

MICHAEL RIEHL, OF PHILADELPHIA, PENNSYLVANIA.

*Letters Patent No.* 13,501, *dated August* 28, 1855; *reissue No.* 3,422, *dated May* 4, 1869.

IMPROVEMENT IN MACHINERY FOR TRIMMING BOOKS.

The Schedule referred to in these Letters Patent and making part of the same.

*To all whom it may concern:*

Be it known that I, MICHAEL RIEHL, of the city and county of Philadelphia, and State of Pennsylvania, have invented a new and improved Machine for Trimming Books and Paper; and I do hereby declare that the following is a full, clear, and exact description thereof, sufficient to enable others skilled in the art to which my invention appertains, to make and use the same, reference being had to the accompanying drawings, making a part of this specification, in which—

Similar letters of reference indicate corresponding parts in the several figures.

Figure 2:
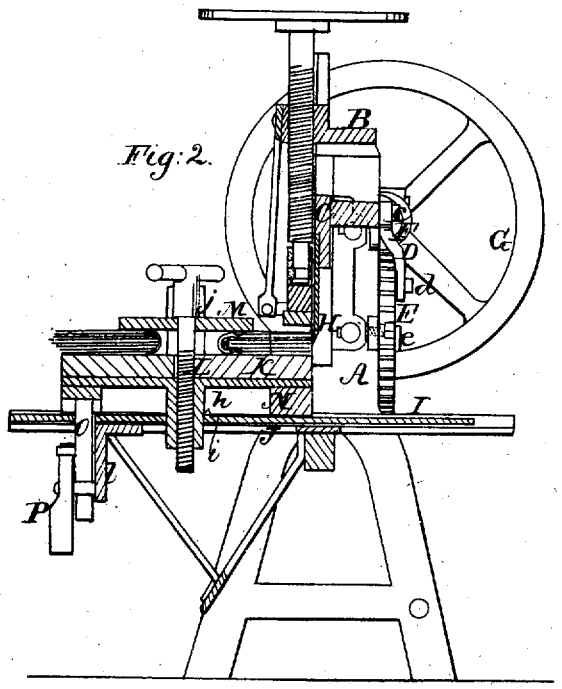
Figure 2 is a transverse vertical section in the line *x x*, fig. 1.

My invention consists in cutting paper, books, &c., by an oblique or quarter-circle cut of a knife, through the medium of a crank, wheel, connecting-rod, or otherwise, so that, when the knife has advanced upon the bed-plate, it will return to its normal position with the same motion, without reversing the wheel.

In the drawings—

A A represent uprights, which are connected together at top by cross-piece B, in any proper manner, and rest upon suitable base or feet.

These uprights are slotted vertically and longitudinally; and into the slots there are fitted and play the ends of a bar or head, C, which is suspended from the cross-piece B, or elsewhere, through the medium of arms *a a*, suitably pivoted to the head and cross-piece.

A knife or cutter-bar, H, is secured to the bar C in any well-known manner.

The arms *a* may be of the same or different lengths, and are adapted to describe the arc of a circle, so as to allow the knife to describe an oblique or circular motion. For this purpose, I pivot to the head C or knife H one end of a pitman-rod, bar, shaft, or its equivalent, D, whose other end is pivoted to a wheel, crank, or connecting-rod, E.

In the present case, I employ a worm-wheel, E, which is mounted on a shaft, *e*, having suitable bearings in an arm, *f*, of the upright A.

A screw or worm, F, gears with the worm-wheel, and its shaft has keyed or otherwise secured to it an operating-pulley, crank, or hand-wheel, G.

Figure 1:
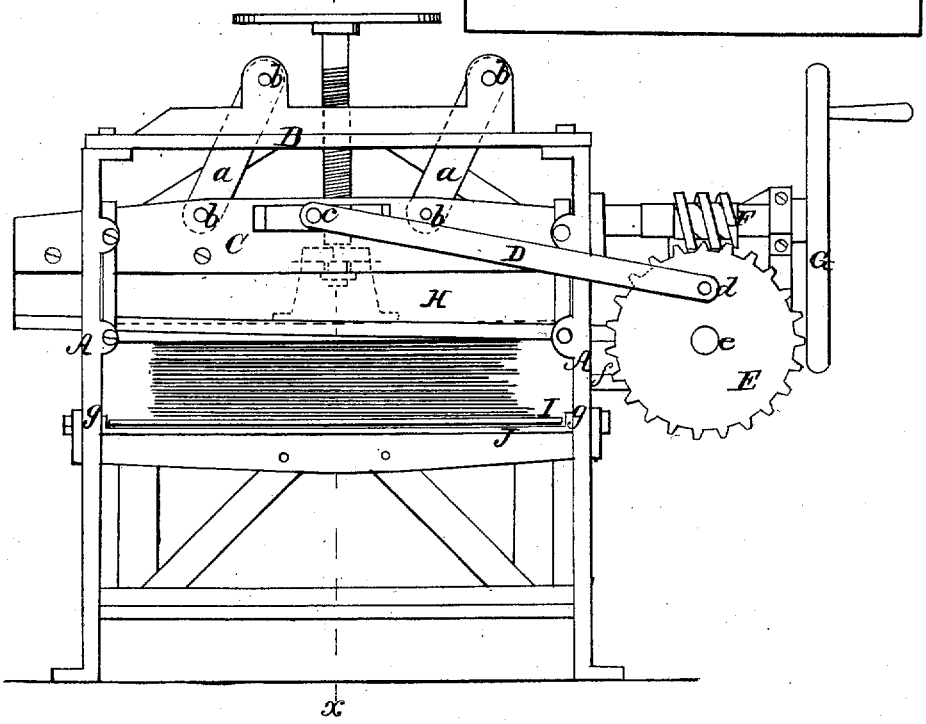
Figure 1 is a front view of the device, illustrating my invention.

I represents a bed, which works upon a horizontal frame, J, and is fitted and moves between ledges or shoulders, *g g*, at the sides of the frame, as shown in fig. 1.

The frame is properly secured between the uprights A.

K is a table, which is, by preference, made square or angular, so as to present each side of the book or paper to the knife.

A tubular projection, *h*, is formed with or attached to the under side of the table K, which projection enters an opening, *i*, in the bed I, as seen in fig. 2.

A screw-rod, L, works in the projection *h*, which is threaded internally for this purpose.

A plate, M, is secured or swivelled to the upper end of the screw-rod, and is guided in its motions by rods or bars *j*, which rise from the table K.

On the under side of table K, I secure an annular plate, N, which has recesses, *k*, formed at intervals, and into which is intended to catch a pawl, O, pivoted to a suitable part of bed I, or elsewhere.

Figure 3:
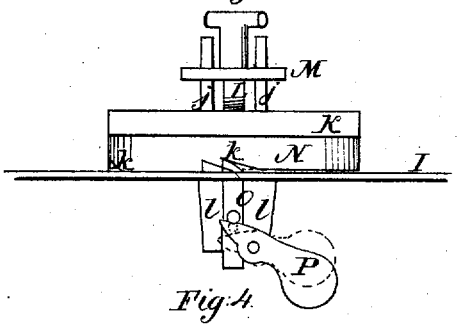
Figure 3 is a detached view of the rotating table.
Figure 4:
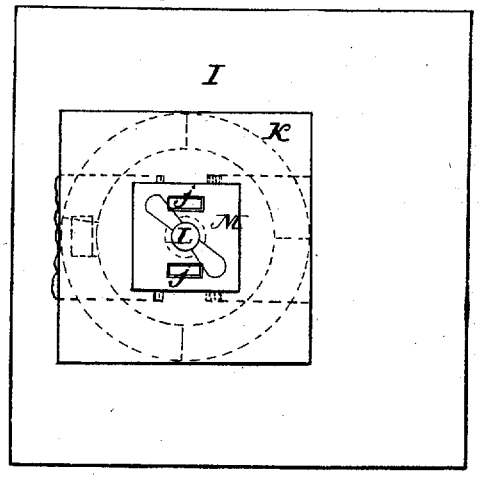
Figure 4 is a top or plan view thereof.

A weighted lever, P, serves to force the pawl upwardly, the pawl being retained between guides *l*, as seen in figs. 2 and 3.

The recesses *k* are of the same form as those cut in ratchets.

It will be perceived that the pawl and notch prevent the rotation of the table K in one direction, but allow it in the other.

The operation is as follows:

The books or paper are placed on the table K, beneath the plate M, on opposite side of the screw-rod L, as seen in red lines, figs. 1 and 2. The plate M is then pressed firmly upon the paper or books, through the medium of the screw-rod. The bed I is now advanced, by hand or otherwise, toward the knife H, until the edge of one of the pieces of paper or books is brought underneath at the proper point to be cut.

Motion is communicated to the wheel or pulley G in any proper manner, and the knife H, owing to the attachment of the bar C to the cross-piece B by the arms *a a*, is brought down upon the paper with a draw-cut, and cuts through the paper, cutting or trimming the edge of the piles of paper or books. The knife now ascends, without reversing the motion of the wheel or crank E.

After this, the table K is turned, to present another side of the books or paper to the action of the knife H, which operates and cuts as before stated.

The table is prevented from turning, while the knife is acting on the paper, by means of the pawl O.

The knife returns to its normal position, and affords ample time for the turning of the table, to present another side of the paper or books to the next downward motion of the knife.

Having thus described my invention,

What I claim as new, and desire to secure by Letters Patent, is—

A device for cutting paper, books, &c., consisting of a knife having a vertical reciprocating motion, as well as a drawing, oblique, or quarter-circle motion, suitable to effect the cutting of the paper, books, &c., imparted to it by a continuously-turning wheel, crank, or equivalent, connected to said knife, substantially as described.

To the above I have signed my name, this 2d day of March, 1869.

M. RIEHL.

Witnesses:

W. A. WIEDERSHEIM,

H. M. WIEDERSHEIM.